United States Patent
Seita et al.

(10) Patent No.: US 9,637,678 B2
(45) Date of Patent: May 2, 2017

(54) ANTICORROSIVE COMPOSITION BASED ON CHLORIDE IONS

(71) Applicant: HITAM FRANCE, La Ferte-Sous-Jouarre (FR)

(72) Inventors: Victor Seita, Dammartin sur Tigeaux (FR); Yann Denolle, Neuilly sur Seine (FR)

(73) Assignee: HITAM FRANCE, La Ferte-Sous-Jouarre (FR)

( * ) Notice: Subject to any disclaimer, the term of this patent is extended or adjusted under 35 U.S.C. 154(b) by 901 days.

(21) Appl. No.: 13/651,738

(22) Filed: Oct. 15, 2012

(65) Prior Publication Data

US 2013/0116155 A1    May 9, 2013

Related U.S. Application Data

(60) Provisional application No. 61/547,253, filed on Oct. 14, 2011.

(30) Foreign Application Priority Data

Nov. 4, 2011  (FR) ...................... 11 60026

(51) Int. Cl.
| | | |
|---|---|---|
| *C09K 8/03* | (2006.01) | |
| *C09D 5/08* | (2006.01) | |
| *C09K 8/54* | (2006.01) | |
| *C09K 3/18* | (2006.01) | |
| *C23F 11/08* | (2006.01) | |
| *C23F 11/14* | (2006.01) | |
| *C23F 11/18* | (2006.01) | |

(52) U.S. Cl.
CPC ............. *C09K 8/54* (2013.01); *C09K 3/185* (2013.01); *C23F 11/08* (2013.01); *C23F 11/149* (2013.01); *C23F 11/18* (2013.01)

(58) Field of Classification Search
None
See application file for complete search history.

(56) References Cited

U.S. PATENT DOCUMENTS

| 3,893,928 A * | 7/1975 | Ono ............. C04B 35/52 |
| | | 106/409 |
| 4,293,639 A | 10/1981 | Itoh et al. |
| 4,654,157 A | 3/1987 | Fukunaga |
| 4,803,007 A | 2/1989 | Garber |
| 5,730,895 A | 3/1998 | Moore |
| 5,853,610 A | 12/1998 | Kaes |
| 5,907,006 A * | 5/1999 | Rennie ............. C09D 5/032 |
| | | 428/386 |
| 7,947,194 B2 | 5/2011 | Seita et al. |
| 2010/0028216 A1 | 2/2010 | Park |
| 2013/0116155 A1 | 5/2013 | Seita et al. |

FOREIGN PATENT DOCUMENTS

| DE | 3141644 A1 | 5/1983 |
| FR | 2 908 780 | 5/2008 |
| JP | 55113801 | 9/1980 |
| JP | 2006241418 | 9/2006 |

OTHER PUBLICATIONS

Partial European Search Report for EP12188527 Completion Date: January 25, 2013.
European Search Report dated May 30, 2013, issued in Application No. EP 12 18 8527.

* cited by examiner

*Primary Examiner* — Jeffrey Washville
(74) *Attorney, Agent, or Firm* — Birch, Stewart, Kolasch & Birch, LLP

(57) ABSTRACT

The present invention relates to a powdery composition comprising a chloride selected from sodium chloride, magnesium chloride, calcium chloride, potassium chloride and mixtures thereof; metal particles of zinc and/or of aluminum and/or a metal salt; and optionally another corrosion inhibitor, and its method of preparation. It also relates to the use of metal particles in such compositions to protect steel or iron structures against the corrosion induced by chloride ions.

14 Claims, No Drawings

# ANTICORROSIVE COMPOSITION BASED ON CHLORIDE IONS

The present invention relates to powdery compositions based on chloride ions further comprising metal particles of zinc and/or of aluminium and/or a metal salt for the purpose of ensuring protection against the corrosion induced by said chloride ions.

The use of compositions comprising chloride ions, such as snow-removing and/or de-icing compositions or compositions used in oil drilling, poses a problem of corrosion of steel and iron structures. Indeed, the presence of chloride ions on metal surfaces favours the exchange of electrons and thus the oxidation-reduction reactions responsible for the degradation of metals.

A need thus exists to protect steel and iron structures against the electrochemical corrosion brought about by the use of compositions based on chloride ions such as snow-removing and/or de-icing compositions or compositions used in oil drilling.

Thus, the present invention provides protection against the electrochemical corrosion induced by the chloride ions contained notably in snow-removing and/or de-icing compositions or in compositions used in oil drilling by introduction in these compositions of metal particles of zinc and/or of aluminium which ensure a sacrificial anode role, and/or by introduction of a metal salt which lowers the resistivity of the solution, and thus allows a quick transfer of electrons, providing protection against the electrochemical corrosion.

The present invention thus relates to a powdery composition comprising a chloride selected from sodium chloride, magnesium chloride, calcium chloride, potassium chloride and mixtures thereof; metal particles of zinc and/or of aluminium and/or a metal salt; and optionally another corrosion inhibitor.

"Powdery composition" is taken to mean a composition constituted of powders having preferably an average particle size below 8 millimeters.

Sodium chloride, calcium chloride, magnesium chloride, potassium chloride and mixtures thereof are salts normally used for their snow-removing and de-icing properties. In fact, these salts make it possible to lower the melting point of the water in which they are dissolved and are capable of melting ice, snow or more generally water in solid form.

Advantageously, the composition according to the invention comprises 50 to 98%, preferably 70 to 90% by weight of chloride with respect to the total weight of the composition.

Advantageously, the chloride is selected from sodium chloride, magnesium chloride, calcium chloride and mixtures thereof, and preferably is calcium chloride.

According to an advantageous embodiment, the composition comprises metal particles of zinc and/or of aluminium and optionally a metal salt. According to a preferred embodiment, the composition comprises metal particles of zinc and/or of aluminium and a metal salt.

The metal particles of zinc and/or of aluminium are used as sacrificial anode vis-à-vis steel and iron structures. The powdered zinc used may be the zinc commercialised by the firm Norzinco GmbH Harzer Zinkoxide under the brand name HZO Farbenzinkstaub. The powdered aluminium used may be the granular aluminium 350 TV commercialised by the firm Métaux et Chimie.

The metal particles according to the invention advantageously have an average particle size comprised between 50 microns and 2 millimeters, preferably between 50 microns and 1 millimeter, and more preferably between 100 microns and 500 microns.

Advantageously, the composition according to the invention comprises 0.1 to 10% and preferably 1 to 5% by weight of metal particles with respect to the total weight of the composition.

Advantageously, the metal particles of the composition according to the invention are in granulated form. Preferably, they are of aluminium.

The metal salt can be a copper, aluminium, zinc, nickel or iron salt.

Advantageously, the metal salt is an iron salt, such as a Fe(II) salt. It can be in particular iron sulphate, such as iron sulphate monohydrate.

Advantageously, the composition according to the invention comprises 0.5 to 20%, notably 0.5 to 10%, advantageously 0.5 to 5%, preferably 1 to 3% by weight of metal salt with respect to the total weight of the composition.

According to a preferred embodiment, the composition comprises metal particles of aluminium and an iron salt, notably a Fe(II) salt which can be in particular an iron sulphate, such as iron sulphate monohydrate.

When it is present in the composition according to the invention, the corrosion inhibitor may be benzotriazole.

Advantageously, the composition according to the invention comprises 0.5 to 10% and preferably 0.5 to 5% by weight of corrosion inhibitor with respect to the total weight of the composition.

The composition according to the invention could be in particular a snow-removing and/or de-icing composition or a composition used in oil drilling, and preferably will be a snow-removing and/or de-icing composition.

Advantageously, the composition according to the invention is a snow-removing and/or de-icing composition which comprises calcium chloride as chloride. Indeed, calcium chloride exhibits a much higher de-icing power than the other chlorides. Its impact on lowering the melting point of water is much greater and its dissolution is highly exothermic, which also contributes to the melting of the snow or the ice.

The calcium chloride present in the composition according to the invention could be in the form of flakes and in the form of beads. Beads have a heat of dissolution greater than flakes (679 kJ/mole compared to 302 kJ/mole) and are thus more efficient. However, the use only of calcium chloride in the form of beads on already slippery surfaces would have an opposite effect to that desired, which explains the necessity of using calcium chloride in the form of flakes. A snow-removing and/or de-icing composition according to the present invention could be in particular a composition as described in the patent FR 2 908 780 with the addition of metal particles according to the present invention and optionally another corrosion inhibitor.

The snow-removing and/or de-icing composition according to the invention could, moreover, comprise at least one additive selected from calcium carbonate, colorants and anti-congealing agents.

The calcium carbonate plays the role of non slip agent. Insoluble in water, it makes it possible to increase adherence to the treated surfaces and to reduce the risk of sliding, by constituting a layer of rough solid particles which remain once the chlorides have dissolved and the snow or the ice melted.

Colorants make it possible to spot directly by eye the zones already treated and thus avoid the excessive use of salts. They may be in particular E102, E104, E110, E131 and mixtures thereof.

Anti-congealing agent is taken to mean any agent whose function is to prevent the reforming in mass, in solid form, of the water melted under the action of the snow-removing and/or de-icing composition. The anti-congealing agent may be in particular urea.

Thus, advantageously, the composition according to the invention is a snow-removing and/or de-icing composition having the following composition by weight with respect to the total weight of the composition:
  70-85% and preferably 77.5% of a chloride according to the invention, such as calcium chloride,
  10-25% and preferably 20.0% of calcium carbonate,
  1-5% and preferably 2.0% of urea, and
  0.1-1% and preferably 0.5% of at least one colorant,
  to which are added metal particles of zinc and/or of aluminium and/or a metal salt; and optionally another corrosion inhibitor,
  advantageously to which are added metal particles of zinc and/or of aluminium, a metal salt and optionally another corrosion inhibitor,
  preferably to which are added metal particles of aluminium; an iron salt, notably a Fe(II) salt which can be in particular an iron sulphate, such as iron sulphate monohydrate; and optionally another corrosion inhibitor.

The snow-removing and de-icing composition to which are added metal particles of zinc and/or of aluminium and/or a metal salt and optionally another corrosion inhibitor may be in particular the composition ABS 4013 commercialised by the firm Hitam.

The invention also relates to a method for preparing a powdery composition as described previously comprising the mixing of the different ingredients.

Preferably, all of the ingredients are mixed at the same time. Thus, all of the ingredients can be introduced into a mixer before being mixed.

More specifically, the mixing may be carried out using a horizontal or vertical rotary powder mixer, or dosing hoppers on conveyor belt.

The invention also relates to the use of metal particles of zinc and/or of aluminium in a powdery composition comprising a chloride selected from sodium chloride, magnesium chloride, calcium chloride, potassium chloride and mixtures thereof to protect steel or iron structures against the corrosion induced by the chloride ions present in said composition.

The steel or iron structures may be metal bridges, rails, the bottoms of coach bodywork, casings or drilling bits.

The composition resulting from the addition of metal particles of zinc and/or of aluminium to a powdery composition comprising a chloride will be more particularly a powdery composition according to the invention as described previously.

The composition can thus comprise a metal salt.

The invention is illustrated, in a non limiting manner, by the following examples.

EXAMPLE 1

Demonstration of the anticorrosion action of particles of zinc and of aluminium added to a snow-removing and/or de-icing composition comprising chloride ions.
Procedure of Tests Carried Out:

100 g of a snow-removing and/or de-icing composition comprising metal particles (zinc, aluminium) or not containing them (control composition) are mixed with 400 g of tap water in a one liter beaker. A steel pot is immersed in the solution. After 48 h, the pot is removed from the beaker, rinsed and dried. The oxidation of the pot is evaluated visually.

For these tests, the snow-removing and de-icing composition used is the composition ABS 4013 commercialised by the firm Hitam and having the following composition (by weight):
  45.0% of calcium chloride in the form of beads,
  32.5% of calcium chloride in the form of flakes,
  20.0% of calcium carbonate,
  2.0% of urea, and
  0.5% of a solution of colorants in isopropanol.

Nevertheless, any other snow-removing and de-icing composition comprising chloride ions could have been used or any other composition useful for oil drilling comprising chloride ions.

The powdered zinc used is the zinc commercialised by the firm Norzinco GmbH Harzer Zinkoxide under the brand name HZO Farbenzinkstaub. This zinc powder has an average particle size of 250 μm.

The powdered aluminium used is the granular aluminium 350 TV commercialised by the firm Métaux et Chimie. This aluminium powder has an average particle size of 350 μm.

Test 1: Compositions Comprising Metal Particles Without Another Corrosion Inhibitor.

For this first test, the metal particles were incorporated at a concentration of 10% by weight to ABS 4013. The following compositions were thus tested:
  (1) 90 g of ABS 4013+10 g of powdered zinc
  (2) 90 g of ABS 4013+10 g of powdered aluminium
  (3) 90 g of ABS 4013+5 g of powdered zinc+5 g of powdered aluminium
  (4) 100 g of ABS 4013 (control)
Results:

The pot from the test with the control (4) exhibited a uniform and intense oxidation on 100% of its surface.

The compositions (1) to (3), for their part, enabled a uniform protection of the steel surface of the pot, no oxidation pitting being visible on the pots.

Test 2: Compositions Comprising Metal Particles and Another Corrosion Inhibitor.

For this second test, pairs of two additives (metal particles+corrosion inhibitor) were used in ABS 4013 as follows:
  (5) 90 g of ABS 4013+5 g of powdered zinc+5 g of benzotriazole
  (6) 90 g of ABS 4013+5 g of powdered aluminium+5 g of benzotriazole
  (7) 100 g of ABS 4013 (control)
Results:

The compositions (5) and (6) enable excellent anticorrosion protection.

Test 3: Reduction of the Concentration of Metal Particles and Optionally of Corrosion Inhibitor.

For this test, lower quantities of metal particles and optionally corrosion inhibitor were incorporated in ABS 4013 as follows:
  (8) 98 g of ABS 4013+1 g of powdered zinc+1 g of powdered aluminium
  (9) 98 g of ABS 4013+1 g of powdered zinc+1 g of benzotriazole
  (10) 98 g of ABS 4013+1 g of powdered aluminium+1 g of benzotriazole

(11) 100 g of ABS 4013 (control)
Results:

The compositions (8) to (10) enable an improvement in the anticorrosion protection. In fact, whereas the pot from the solution containing the control (11) exhibits a 100% oxidised surface, the composition (9) reduced the oxidation by around 50% and the composition (10) by around 90%. The composition (8), for its part, enabled an almost perfect protection of the surface.

Conclusions:

The presence of metal particles (zinc and/or aluminium) thus enables good protection against the corrosion of steel and iron by chloride ions.

EXAMPLE 2

Analysis of the Protection Against Electrochemical Corrosion

1. Demonstrating the Rate Of Implementation of Cathodic Protection on a Composition Based on Calcium Chloride (ABS 4013)

Procedure:

In a beaker, 100 g of water and 50 g of a composition based on chloride ions are mixed together, then a steel plate emerging from the solution is added.

The composition based on chlorides is ABS 4013 comprising or not an additive constituted of 1% by weight of granular aluminium 16/45 and 1% by weight of benzotriazole with respect to the total weight of the composition.

A device composed of a programmable microcontroller (in C language) equipped with analogue to digital converters (ADC) is used. The device enables the acquisition of potentials from an electrode and to deduce thereof a potential difference with an internal reference. The surface potentials of each plate are noted with respect to the programme reference.

Results:

|  | Potential difference with respect to an internal reference (mV) | | | | | |
|---|---|---|---|---|---|---|
| Time | 30" | 1' | 2' | 3' | 10' | 30' |
| Composition without additive (control) | −130 | −140 | −130 | −120 | −130 | −130 |
| Composition with additive according to the invention | −140 | −210 | −260 | −300 | −330 | −320 |

The circulation of electrons in the solution comprising the composition with additive is quite rapid. These electrons come from the dissolution of the aluminium, which thus indeed behaves as a sacrificial anode.

In the solution comprising the composition with additive, a stabilisation is observed, after 3 minutes, of the potential difference towards −330 mV which brings the lowering of the surface potential to around −190 mV, a value quite close to that of cathodic protection standards in aqueous media (−250 mV).

2. Comparisons of the Cathodic Protection from Various Origins of Chloride Ions

Procedure:

The preceding experiment is repeated with, as compositions based on chloride ions, ABS 4013 (calcium chloride), sodium chloride or magnesium chloride. One thus has three beakers each containing one of the three compositions based on chlorides without additive and three beakers each containing one of the three compositions based on chlorides with the additive mentioned in the preceding experiment.

The potential difference is measured between the plates of beakers containing respectively one of the three compositions based on chlorides with the additive and the same composition without additive, a saline bridge having to be placed between the two beakers, which may take the form of a metal wire. This potential difference is measured, this time, using a laboratory voltmeter, position 1V cc.

Results:

The results obtained with the compositions with additives are described hereafter.

|  | Potential difference (mV) between compositions with and without additive | | | | | |
|---|---|---|---|---|---|---|
| Time | 5' | 1 h | 24 h | 3 days | 7 days | 28 days |
| ABS 4013 | −120 | −130 | −125 | −140 | −120 | −125 |
| Sodium chloride | −90 | −130 | −95 | −120 | −130 | −130 |
| Magnesium chloride | −95 | −110 | −130 | −125 | −120 | −120 |

The potential differences are relatively stable over time whatever the salt used, and independent of the origin of the chloride ions.

EXAMPLE 3

Measuring the Mass Loss of a Steel Plate Immersed in a Solution with Calcium Chloride Flakes Procedure:

The immersion duration is 72 hours.

The test is performed with six identical plates, three by beaker.

The test is run at constant temperature, preferably under 6° C.

The test is performed at pH 6.

Preparing the Steel Plates:

The plates have the following features:
weight: 24.260 g,
surface: 47.66 cm$^2$.

The plates are abraded, deoxidized in a solution of hydrochloric acid, degreased, rinsed and dried, and then weighed before beginning the test.

Preparing the Beakers:

Two beakers are prepared.

Beaker N° 1 contains 90 wt % demineralized water and 10 wt % calcium chloride flakes.

Beaker N° 2 contains 90 wt % demineralized water, 10 wt % composition comprising 96.5 wt % calcium chloride flakes, 1 wt % granular aluminium, 0.5 wt % benzotriazole and 2 wt % iron sulphate monohydrate with respect to the total weight of the composition.

Then the pH of the solutions are adjusted to pH=6 by addition of a base or an acid. In this example, the base used was soda and the acid used was hydrochloric acid and/or citric acid. However any other base or acid can be used.

Test:

3 steel plates are placed inside each beaker and completely immersed. The beakers are placed in a refrigerator having a constant temperature under 6° C. for 72 h.

At t=72 h, the plates are removed from the beakers, cleaned and weighed.

The weight loss is calculated as an average of the weight loss of the three plates in each beaker.
Results:
The average weight loss measured is as follows:
for beaker No 1: 0.0107 g,
for beaker No 2: 0.0008 g.

The invention claimed is:

1. A powdery snow-removing and/or de-icing composition comprising
   50 to 98% by weight of sodium chloride, magnesium chloride, calcium chloride, potassium chloride or a mixture thereof with respect to the total weight of the composition;
   0.1 to 5% by weight of metal particles of aluminum with respect to the total weight of the composition;
   an Fe(II) metal salt; and
   optionally a corrosion inhibitor.

2. The powdery composition according to claim 1, comprising 70 to 90% by weight of chloride with respect to the total weight of the composition.

3. The powdery composition according to claim 1, comprising 1 to 5% by weight of metal particles with respect to the total weight of the composition.

4. The powdery composition according to claim 1, wherein the average particle size of the metal particles is comprised between 50 microns and 2 millimeters.

5. The powdery composition according to claim 4, wherein the average particle size of the metal particles is comprised between 100 microns and 500 microns.

6. The powdery composition according to claim 1, comprising 0.5 to 20% by weight of the Fe(II), metal salt with respect to the total weight of the composition.

7. The powdery composition according to claim 6, comprising 1 to 3% by weight of the Fe(II) metal salt with respect to the total weight of the composition.

8. The powdery composition according to claim 1, wherein the Fe(II) metal salt is an iron sulphate.

9. The powdery composition according to claim 8, wherein the Fe(II) metal salt is iron sulphate monohydrate.

10. The powdery composition according to claim 1, comprising 0.5 to 10% by weight of the corrosion inhibitor with respect to the total weight of the composition.

11. The powdery composition according to claim 10, wherein the corrosion inhibitor is benzotriazole.

12. The powdery composition according to claim 1 further comprises at least one additive selected from calcium carbonate, colorants and anti-congealing agents.

13. The powdery composition according to claim 1, comprising the following by weight with respect to the total weight of the composition:
    70-85% of chloride,
    10-25% of calcium carbonate,
    1-5% of urea, and
    0.1-1% of at least one colorant,
    to which are added metal particles of aluminium; optionally a metal salt; and optionally a corrosion inhibitor.

14. A method for preparing a powdery composition according to claim 1 comprising the mixing of the different ingredients.

* * * * *